UNITED STATES PATENT OFFICE.

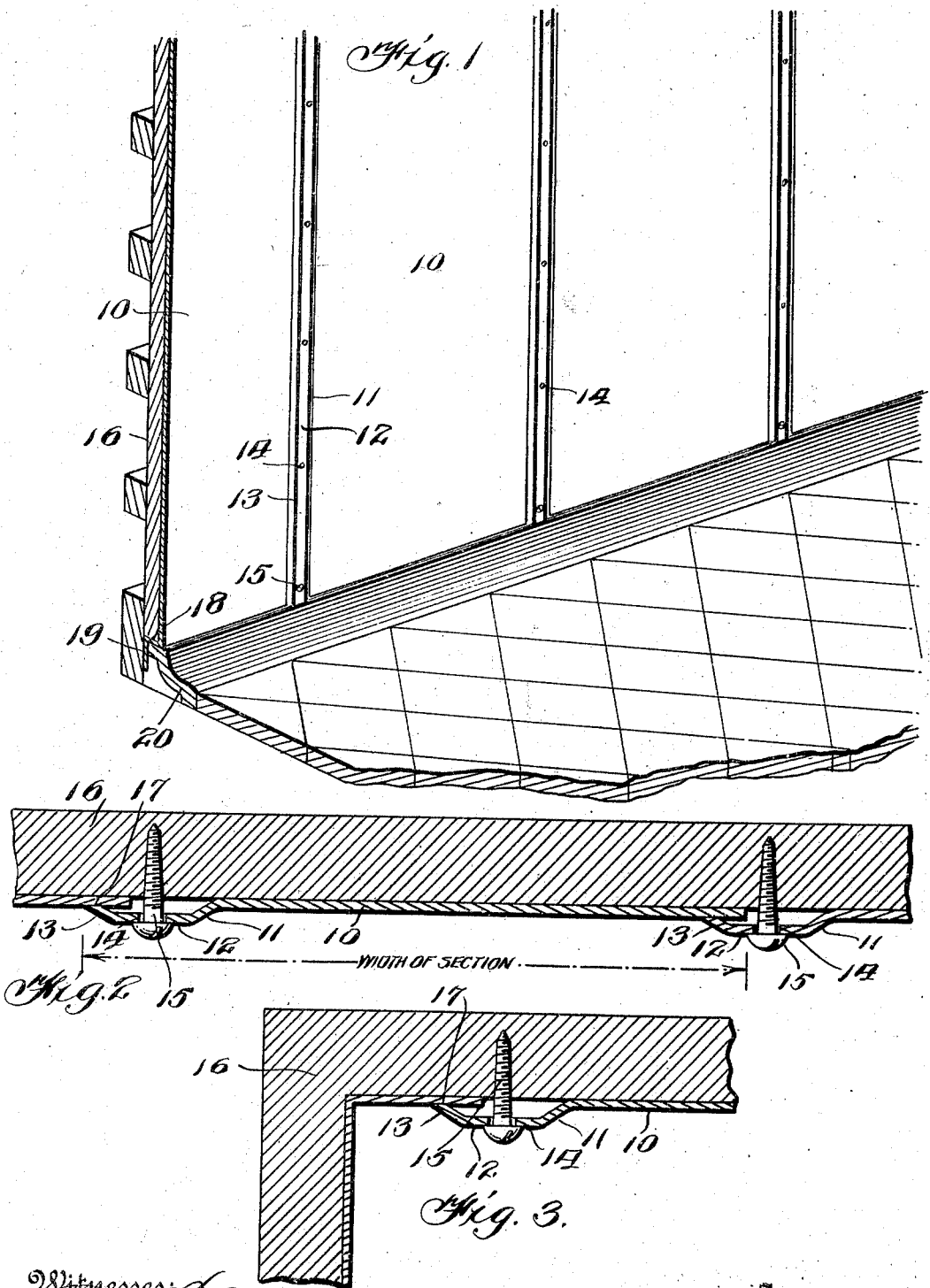

VICTOR A. DE CANIO, OF UNION HILL, NEW JERSEY.

REFRIGERATOR-LINING.

1,060,432.

Specification of Letters Patent.  Patented Apr. 29, 1913.

Application filed March 2, 1912.  Serial No. 681,130.

*To all whom it may concern:*

Be it known that I, VICTOR A. DE CANIO, citizen of the United States, residing at Union Hill, in the county of Hudson and State of New Jersey, have invented certain new and useful Improvements in Refrigerator-Linings; and I do hereby declare the following to be a full, clear, and exact description of the invention, such as will enable others skilled in the art to which it appertains to make and use the same.

My invention relates to wall linings and more particularly to metallic enamel linings for cold storage and similar chambers.

The object of my invention is to provide a means for securing a lining to the walls thereof so as to produce an ornamental appearance, a tight joint, an adjustable and expansible joint and a joint which is secure yet at the same time does not crack or effect the enamel coating.

Further objects will be apparent from the following specification, appended claims, and drawings, in which, Figure 1 is a perspective view of a portion of a wall equipped in accordance with my invention, Fig. 2 is a horizontal sectional view therethrough, Fig. 3 is a similar view showing my invention applied to a corner.

In securing enamel linings to cold storage or other chambers much trouble is experienced in making tight joints as well as overlapped joints without injuring the enamel. It is further necessary that some provision be made for expansion and contraction of the linings for iceboxes as a variation of temperature causes the lining to expand and contract as the case may be and with the lining securely held to the walls of the icebox something must give to permit contraction when the icebox is in use.

To overcome the above objections and to produce the desired results, I provide the enameled or other lining, 10, which may be made in sections so that the same may be applied to an icebox of any size. One edge of each of the sections 10 is in the same plane as the major portion thereof while the opposite edge is offset from the plane of the major portion as at 11, then parallel with the plane of the major portion as at 12, and then bent as at 13, toward the plane of the major portion as shown. The rib formed by the portions 11, 12, and 13 is resilient to a certain degree and the portion 12 is provided with a plurality of openings 14, along the center thereof to receive screws 15, which are adapted to engage the wall of the icebox as shown by the numeral 16. The extreme outer edge of the section 10, is beveled as at 17 so that when clamped against the upper edge of a lower section a tight joint is formed. When the several sections are applied the ribbed edge of one section overlaps the plain edge of the adjacent section and said sections are relatively spaced with one another so that the screw 15 clears the plain edge of the adjacent section by quite an interval of space so as to permit expansion of that member.

In Fig. 3 of the drawing, I have shown a portion of a section 10 provided with the usual rib and screw 15, but have shown the adjacent member of angular outline which section constitutes a corner section.

Enameled sections as now procurable are equal approximately in length to the height of the storage chamber and by my invention it is possible to combine a number of these lengths to line a chamber of any size. Each of the sections are provided with lateral and depending flanges at one end thereof as shown by the numerals 18 and 19 which portions are intended to receive a tile or molding 20. The rib of each section is cut at its end so that a fit is provided with the surface of the molding 20.

The space within the ribs of the several sections may be filled with mineral wool or the like if so desired.

Having thus described my invention, I claim:

1. In a refrigerator lining, a housing, a plurality of enameled metal sections secured to the walls thereof, each of said sections having the major portions thereof in a common plane, each of said sections having a single series of fastening means, a rib formed along the one edge of each of said sections, said rib being formed by a portion of said section being bent from the common plane, the extreme edge of said ribbed section being beveled to the same plane as the major portion of said section, said ribs being perforated at intervals said sections being secured to the walls by screws passing through said perforations, and the rib and beveled face of one section overlapping the plain edge of the adjacent section by a slidable contact in such a way that the fastening means of each section do not contact with other sections.

2. In a refrigerator, a housing, a plurality of enameled metal sections secured to the walls thereof, each of said sections having a single series of fastening means, a rib formed on each of said sections, said rib portions being perforated, said rib portion of each section overlapping the plain edge of the adjacent section, said rib portions being secured to the walls of the housing as by screws and the plain edge of each section having free movement for expansion under said rib portion of the adjacent section.

3. In an enameled metal room lining, sections of enameled metal of the desired width and height, the major portion of each of said sections being in the same plane, the rib formed of a portion of each of said sections by bending said sections from the plane of the major portion and by further bending said bent portion back on the plane of the major portion, the extreme edge of said bent portion being beveled to the plane of the major portion, the rib formed being provided at intervals with perforations and the extreme edge of said rib being distant from the perforations.

VICTOR A. DE CANIO.

Witnesses:
 ALFRED D. WICKES,
 HUGO MOCK.

Copies of this patent may be obtained for five cents each, by addressing the "Commissioner of Patents, Washington, D. C."